(12) United States Patent
Wood et al.

(10) Patent No.: US 8,433,182 B2
(45) Date of Patent: Apr. 30, 2013

(54) VIDEO DATA RECORDER WITH PERSONAL CHANNELS

(75) Inventors: Anthony Wood, Palo Alto, CA (US); Donald Woodward, Jr., Los Altos, CA (US); Edward Kessler, Los Gatos, CA (US); Douglas Shannon, Mountain View, CA (US); Spencer Shanson, Mountain View, CA (US); Karl Townsend, Los Altos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 388 days.

(21) Appl. No.: 12/827,739

(22) Filed: Jun. 30, 2010

(65) Prior Publication Data
US 2010/0266261 A1   Oct. 21, 2010

Related U.S. Application Data

(63) Continuation of application No. 10/386,585, filed on Mar. 11, 2003, now Pat. No. 7,773,860, which is a continuation of application No. 09/131,091, filed on Aug. 7, 1998, now abandoned.

(51) Int. Cl.
*H04N 5/76* (2006.01)
(52) U.S. Cl.
USPC .............. 386/296; 386/291; 386/297; 725/46
(58) Field of Classification Search .................. 386/291, 386/296, 297; 725/46, 58
See application file for complete search history.

(56) References Cited

U.S. PATENT DOCUMENTS

| 5,751,282 | A | * | 5/1998 | Girard et al. ................. 715/721 |
| 6,035,091 | A | | 3/2000 | Kazo |
| 6,219,839 | B1 | * | 4/2001 | Sampsell ........................ 725/40 |
| 7,185,355 | B1 | * | 2/2007 | Ellis et al. ....................... 725/46 |
| 8,134,645 | B2 | * | 3/2012 | Yuen et al. .................... 348/565 |

FOREIGN PATENT DOCUMENTS

| JP | 07-079423 | 3/1995 |
| JP | 07-160732 | 6/1995 |

(Continued)

OTHER PUBLICATIONS

Canadian Examiner's Report, Canadian Patent Application No. 2,339,784 dated Sep. 9, 2010.

*Primary Examiner* — Thai Tran
*Assistant Examiner* — Mishawn Dunn
(74) *Attorney, Agent, or Firm* — McDonnell Boehnen Hulbert & Berghoff LLP

(57) ABSTRACT

A video data recordable having integrated channel guides allowing a user to control recording and storage of television signals into personal channels for later playback and viewing. In the described embodiment, the user may specify criteria for recording of shows from an input source such as a broadcast signal and shows are then selected based on the user specified criteria and recorded for later playback. Storage of the shows may be organized into personal channels in order to facilitate later playback, e.g., the user may specify a channel of action movies, a channel of nature programming, a channel for sports, etc. The shows to be recorded may also have a predefined format which may be used to ease playback of recorded programming by allowing the user to easily locate and playback sections of programming of interest.

18 Claims, 6 Drawing Sheets

FOREIGN PATENT DOCUMENTS

| | | |
|---|---|---|
| JP | 08-329558 | 12/1996 |
| JP | 09-070020 | 3/1997 |
| JP | 09-107526 | 4/1997 |
| JP | 09-247602 | 9/1997 |
| JP | 10-164528 | 6/1998 |
| WO | WO 9222983 | * 12/1992 |

* cited by examiner

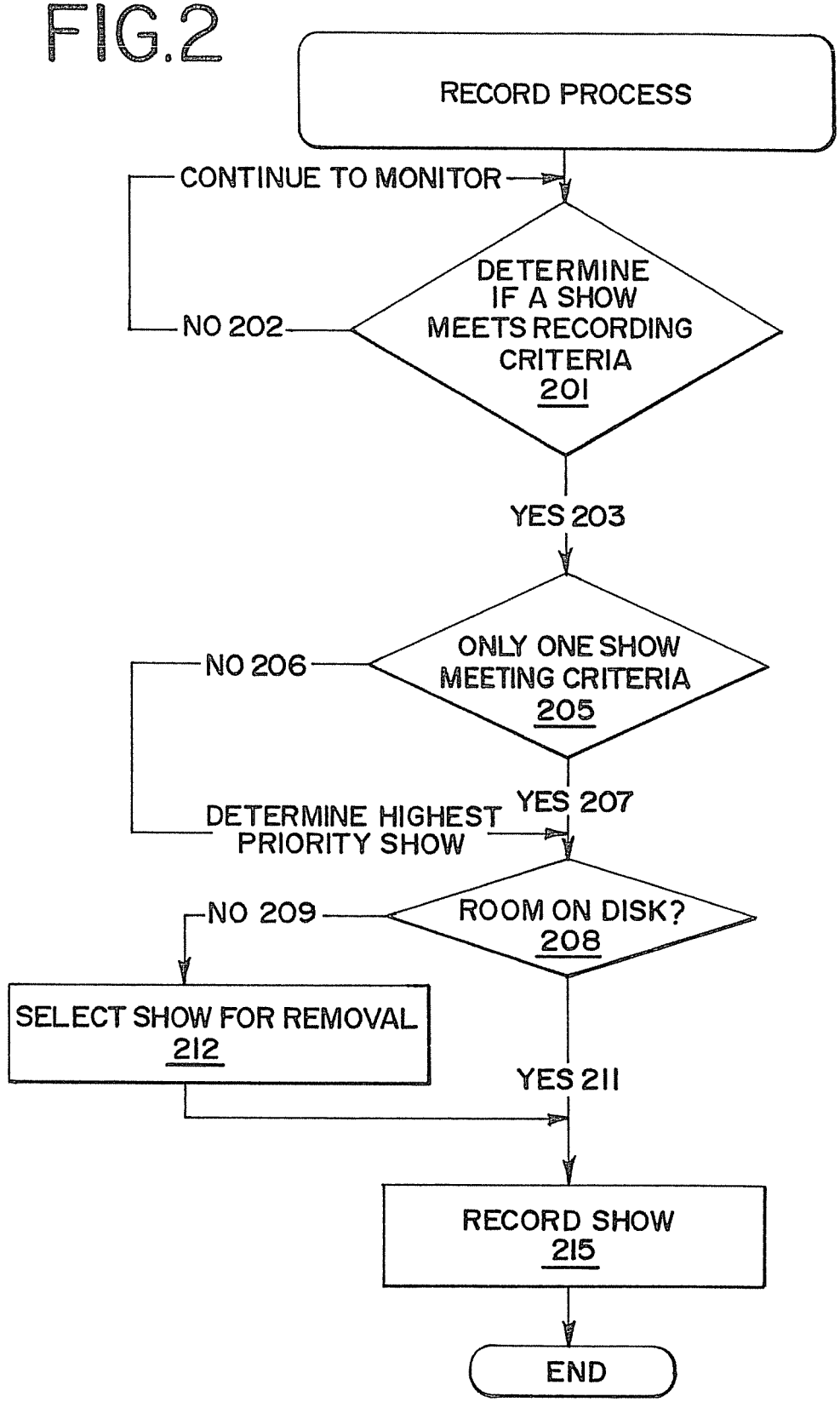

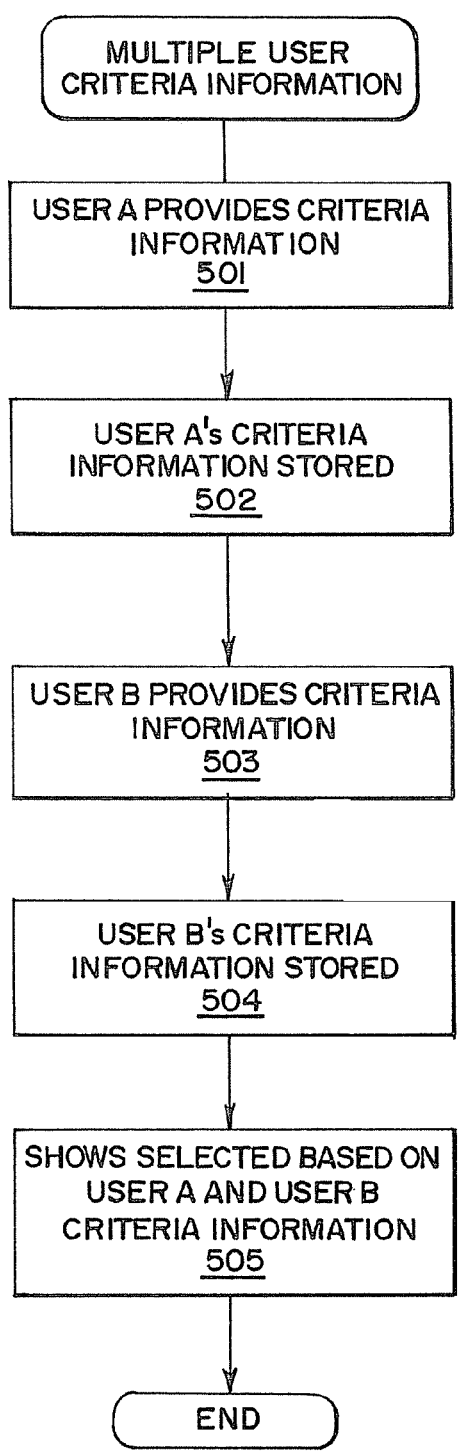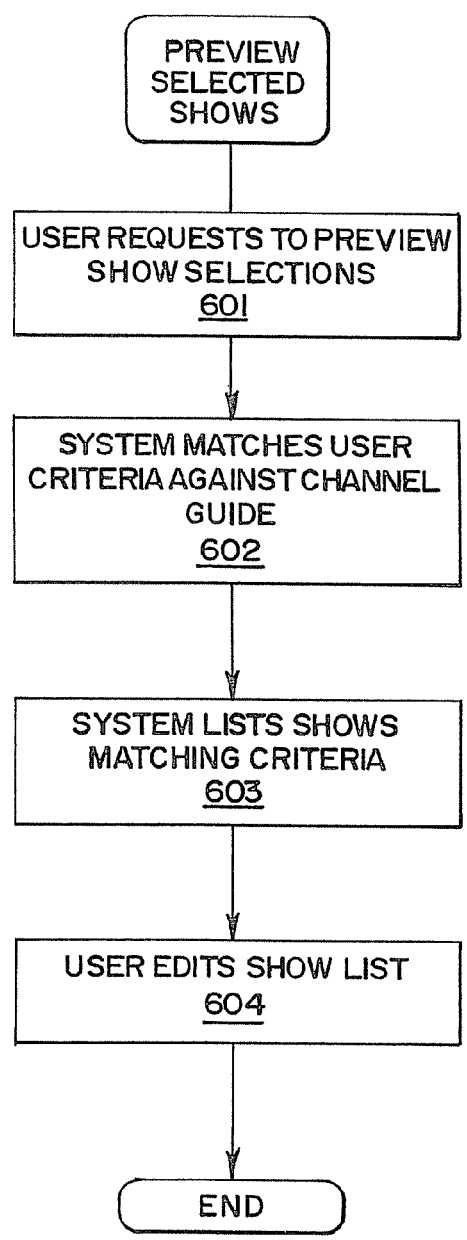

VIDEO DATA RECORDER WITH PERSONAL CHANNELS

BACKGROUND OF THE INVENTION

1. Field of the Invention

The present invention relates to the field of video data recorders and, more specifically, to digital video data recorders such as may be used to record and play back video signals.

2. Description of the Related Art

Video data recorders are well-known in the art. Initially, video data recorders were designed to record video signals on video tape and to allow play back of recorded video signals from the tape. Of course, video tapes require sequential recording and playback limiting the functionality of such machines.

Disk-based video playback machines have been introduced such as video disks and more recently digital video disk machines. These machines may be generally characterized as providing a removable randomly accessed disk allow for the storage and playback of video signals.

U.S. Pat. No. 5,241,428 (the '428 patent) describes a video recording and playback device. The described system provides for simultaneous playback and recording of video signals on a randomly accessed recording medium. By allowing simultaneous recording and playback of video signals and by allowing for random access of the recording medium, additional functionality may be provided beyond that realized by a video tape recording machine.

While the '428 patent describes a randomly accessed video recording and playback device, it fails to describe or suggest significant functionality which may be implemented in such a device. Thus, what is needed is an improved video data recorder having increased functionality.

Channel guides are well-known in the art. A channel guide is a catalog of television broadcasts together with the times and channels for play of each television broadcast. Perhaps one of the best known channel guides is the TV Guide™ channel guide which has been available by subscription and in magazine racks for years. More recently, on-line versions of channel guides have become available. These all have in common that they list titles of television programs, together with the time and channel on which the television program will air. In addition, the channel guide may provide a short synopsis of the program and other information such as names of actors, directors, program length, rating information, parental control information, whether the program is new programming or a rerun, and information categorizing the program (e.g., action movie, children's movie, sitcom, news broadcast, etc.).

Unfortunately, there has not been sufficient integration of the channel guides with record and playback capabilities of video data recorders.

SUMMARY OF THE INVENTION

A video data recorder operating under control of a processor utilizing channel guide data and user entered selection criteria is described. The video data recorder also provides for recording of programming into personal channels into order to facilitate organization of the recorded shows.

BRIEF DESCRIPTION OF THE DRAWINGS

FIG. 2 is a flow diagram illustrating a method for recording programming as may be implemented by an embodiment of the present invention.

FIG. 5 is a flow diagram illustrating a method for selection of shows for recording based on multiple user's criteria.

FIG. 6 is a flow diagram illustrating a method for previewing shows selected for recording.

Figure 1:
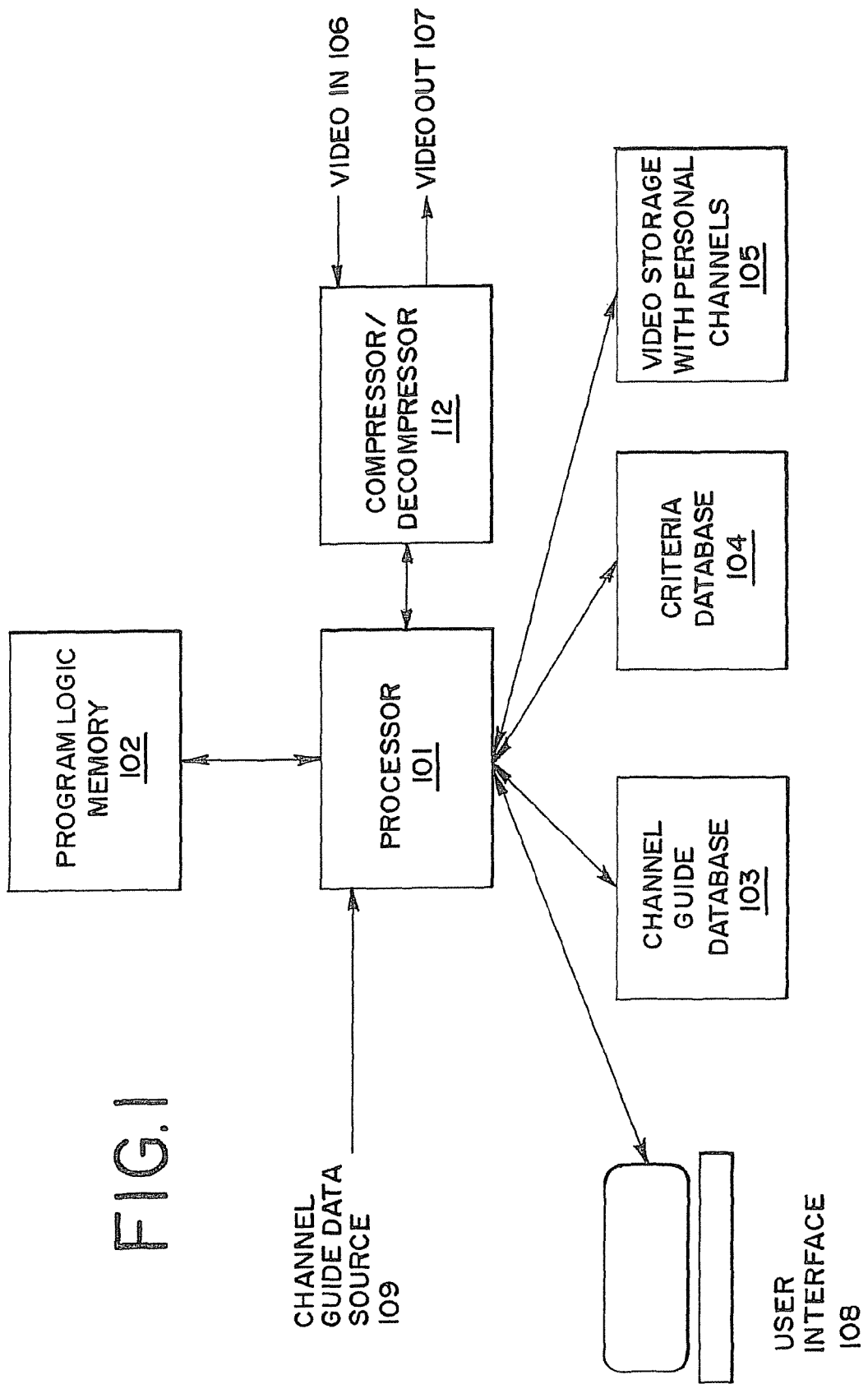
FIG. 1 is a high level block diagram illustrating a video data recorder of an embodiment of the present invention.
Figure 4:
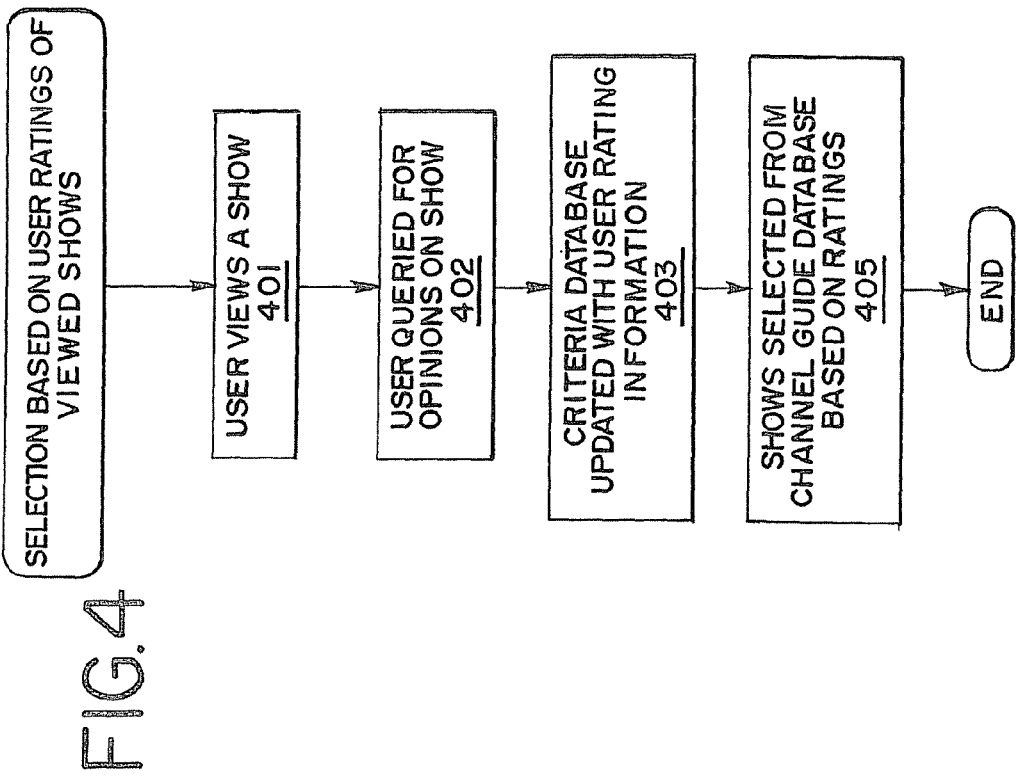
FIG. 4 is a flow diagram illustrating a user rating feedback process.
Figure 3:
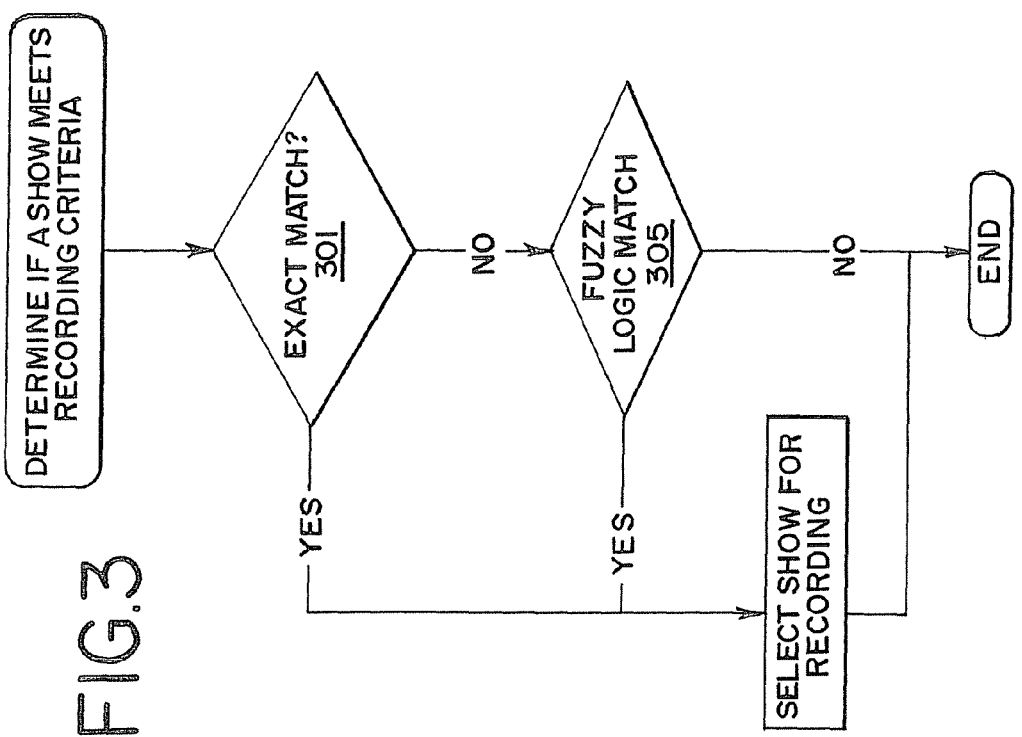
FIG. 3 is a flow diagram illustrating a method for determining if a show meets recording criteria.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

Block Diagram Architecture of the VDR

FIG. 1 provides a high level block diagram view of a video data recorder (VDR) as may utilize the present invention.

A processor 101 is coupled in communication with a channel guide database 103, a criteria database 104, video storage 105 (also referred to as the recording medium), program logic memory 102, a video compressor/decompressor 112, a video input source 106, a video output 107, a channel guide data source 109 and a user interface 108.

The processor 101 may be any of a plurality of commercially available processors such as the a processor from the Motorola 68000 series of processors, a processor from the Intel 8086 family of processors or a higher level processor such as a processor from the Intel Pentium™ family of processors or from the Motorola PowerPC™ family of processors. The processor in the described embodiment acts under program control by a program stored in program logic memory 102 to perform functions which will be described in greater detail below.

The channel guide data source 109 provides periodic updates to the local channel guide database, 103. As will be described in greater detail below, the channel guide data source 109 provides program titles, start times, end times, channel information and other criteria (such as ratings, descriptions of shows, names of actors, producers, directors, awards and rating information) regarding channel programming. Channel guide data sources are available commercially from TVGuide, TV Data, and Tribune media. The channel guide source may be accessed periodically to obtain changes and additions over any of a number of communication mediums. For example, the channel guide source may be accessed telephonically by a modem connection to a server or by receiving broadcasted updates and changes from a source such as satellite or terrestrial VBI, national pager network or the internet. In other embodiments, the channel guide source may be obtained periodically such as by subscription and received on a recording media such as a disk through the mail or other source.

The channel guide database 103 is illustrated in the described embodiment as being stored on a locally attached disk. In alternative embodiment, the channel guide database may be stored locally in alternative storage media such as RAM. In other embodiments, a channel guide database 103 may be stored on a remote server and queried for matches with the criteria database 104 periodically. The locally stored channel guide database 103 would be replaced with a "match" database in such an embodiment. Such an embodiment reduces the need for local storage and reduces the required bandwidth and processing power to periodically obtain and store a complete local channel guide database. However, this embodiment does depend on a relatively reliable connection to the server storing the channel database.

The criteria database 104 provides criteria for selection of programming from the channel guide database. The criteria is user defined and input through user interface 108. Based on matches between the criteria database 104 and the channel guide database 103, the processor causes video input signals to be recorded on video storage 105.

In the described embodiment, video storage 105 is a high capacity, recordable, randomly accessible recording medium such as a hard disk. Use of a randomly accessible recording medium provides certain advantages such as allowing a user to simultaneously record and playback video signals. Thus, a user may view a program as it is being recorded and take advantage of the rewind, pause and fast forward capabilities of the VDR. However, in certain embodiments a sequential recording medium may be utilized without departure from certain aspects of the present invention.

Importantly, the disclosed embodiment provides certain user interface features. For example, in the disclosed embodiment it is possible to fast forward and rewind through recorded programming. The user may increase the rate of fast forwarding and/or rewinding by continuing to depress the fast forward and/or rewind button for a period of time. For example, if the button is pressed for instantaneously, the system may fast forward or rewind at one speed and the speed may continuously increase the longer the button is depressed.

In addition, the described embodiment provides an instant replay function. The user may depress the instant replay button and the system will automatically "rewind" (i.e., move the point of viewing of the programming back in time) a predetermined amount (e.g., 5 seconds) in the programming.

The video input source 106 may be any of a number of sources including cable, over-the-air broadcast and satellite. In certain embodiments, multiple video input sources may be utilized. The video output source 107 is typically coupled with a display device such as a television but may also be coupled with another video data recorder.

The video compressor/decompressor 112 provides for compressing and decompressing the video signal. Any commercially available compression technology may be utilized including by way of example MPEG and MPEG II.

In alternative embodiments, the data may be received in a compressed format. In such an embodiment, the compressor may not be utilized or even required and the decompressor may only be utilized to decompressed the compressed signals.

Figure 7:
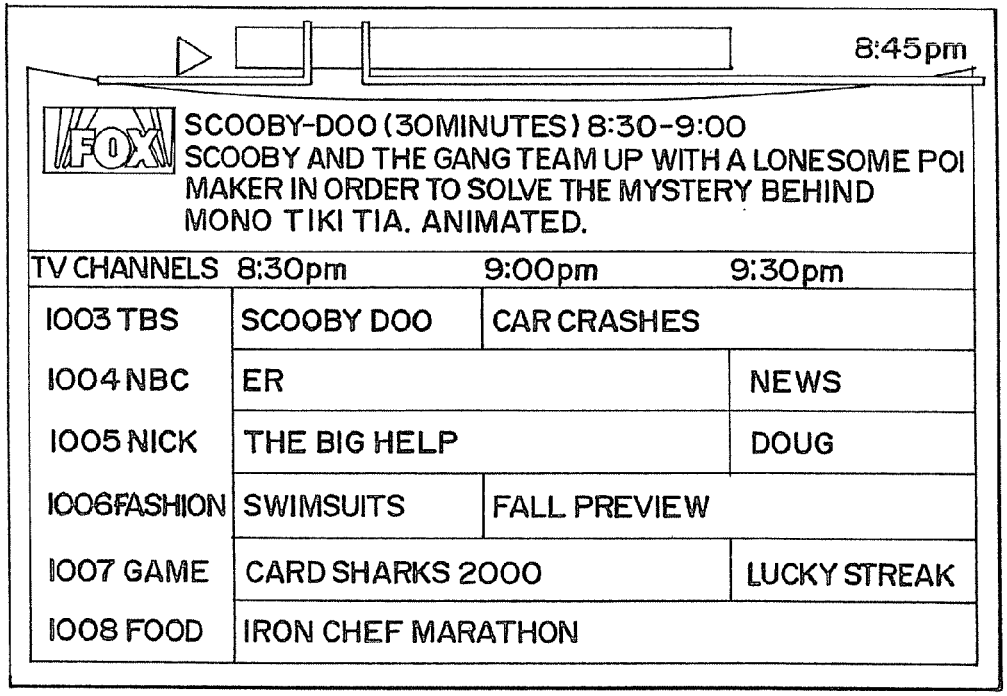
FIG. 7 is a screen shot illustrating a channel guide as may be implemented in the present invention.

FIG. 7 illustrates a screen shot showing a user interface display of information from a channel guide. As can be seen, the display shows channels, show names and start and end times. Detailed information on any particular show can be displayed in a top portion of the screen. Alternative user interfaces will be apparent to one skilled in the art.

Recording of Video Programming

Turning now to FIG. 2, an overall method of recording programming is described. In accordance with FIG. 2, the processor 101 monitors the criteria database 104 and the channel guide to determine when programming is available which meets predetermined user selectable criteria, block 201. The user or users may have previously provided criteria over user interface 108. In the described embodiment, any of a number of criteria may be specified. Various criteria are discussed in greater detail below. If no current programming meets the preselected criteria, branch 202, the processor 101 continues to monitor for programming meeting the criteria.

When programming is available which meets the criteria, branch 203, a determination is made whether multiple programs simultaneously meet the criteria. In certain embodiments, only a single video input source 106 may be provided allowing only a single program to be recorded at a time. In alternative embodiments, multiple video input sources may be available allowing simultaneous recording of multiple channels. If sufficient video input sources are not available to allow recording of all shows which meet the criteria, branch 206, the system determines the highest priority programming based on user provided priority information.

If only a single show meets the criteria (or in implementations having multiple video inputs, a number of shows less than or equal to the number of inputs), branch 207, then a determination is made whether there is room on the disk for recording the show, block 208. If there is room on the disk, branch 211, the show is recorded, block 215. If there is not room on the disk, branch 209, a determination is made whether there are shows which may be selected for removal, block 212. In one embodiment, a show may be selected for removal if it is a lower priority than the show to be recorded. Other criteria may also be used. For example, as will be discussed in greater detail below, the described embodiment provides for "personal channels" into which selected programming may be stored. For example, a personal channel may be established to store all episodes of a particular situation comedy. Another personal channel may be established to store news broadcasts. If the show to be recorded is, for example, a new episode of the situation comedy, the earliest episode of the situation comedy in the personal channel may be deleted.

In addition to storing the video data for a show selected for recording, the system also stores the meta data associated with the show from the channel guide, e.g., names of actors and actresses, director, ratings information, textual descriptions of the show, etc. This information may then be recalled by the user at any time in order to assist in making a decision of whether the watch the particular recorded show.

Criteria Database

As has been discussed, the criteria database 104 stores user specified criteria for selection of shows for recording. The user may specify criteria for recording shows including a show title, a keyword such as actor or director name or text from a description of the show, a show class (such as action, mystery, childrens, etc.) and rating information (both parental control and quality ratings).

The user can also specify the priority of the show. If two shows are scheduled to be recorded at the same time, the higher priority show will take precedent. The user may specify the number of shows in a series to record (e.g., keep the most recent two shows). In addition, the user may specify whether reruns are to be recorded and whether syndicated reruns are to be recorded (e.g., record reruns, but not syndicated reruns, record all reruns, etc.).

In certain embodiments, the user interface may provide for improved data input methods to ease the input of criteria information by the user. For example, when specifying a show name, the user may be presented with a pop-up alphabetical menu of all show titles in the channel guide database 103.

The pop-up menu may be derived by searching the channel guide database 103 for all titles of shows, for all actors/actresses, directors, etc. and storing them. The pop-up display may display the information, for example, in alphabetical order. Because the channel guide database 103 at any point in time does not provide a complete list of all show titles, actors/actresses, directors, etc. (e.g., because a particular director may not have any shows airing during the time period covered by the channel guide database 103), the system may incrementally save new show titles, actor/actresses, etc. from new copies of the channel guide database 103 as the channel guide database is updated. In this way, over a period of time, the system will derive a relatively complete list for the pop-up menus. In the event a desired show title, actor/actress, director, etc. is not available in the pop-up menu list, the system may allow the user to manually enter a name.

In order to simplify the display, the user may be presented with a list of letters (A-Z) and given the opportunity select a letter (e.g., B) in order to obtain a list of all titles beginning with the selected letter.

Other alternative methods may also be employed for displaying the lists including for example, a hierarchical list.

These data entry methods not only ease data entry for the user but also alleviates data entry problems. Similar methods may be used for selection of actors and directors (e.g., the pop-up menu for actors may list all actors names in the channel guide database 103) or for selection of topics (e.g., a pop-up menu of all topics available in the channel guide database 103).

Figure 8:
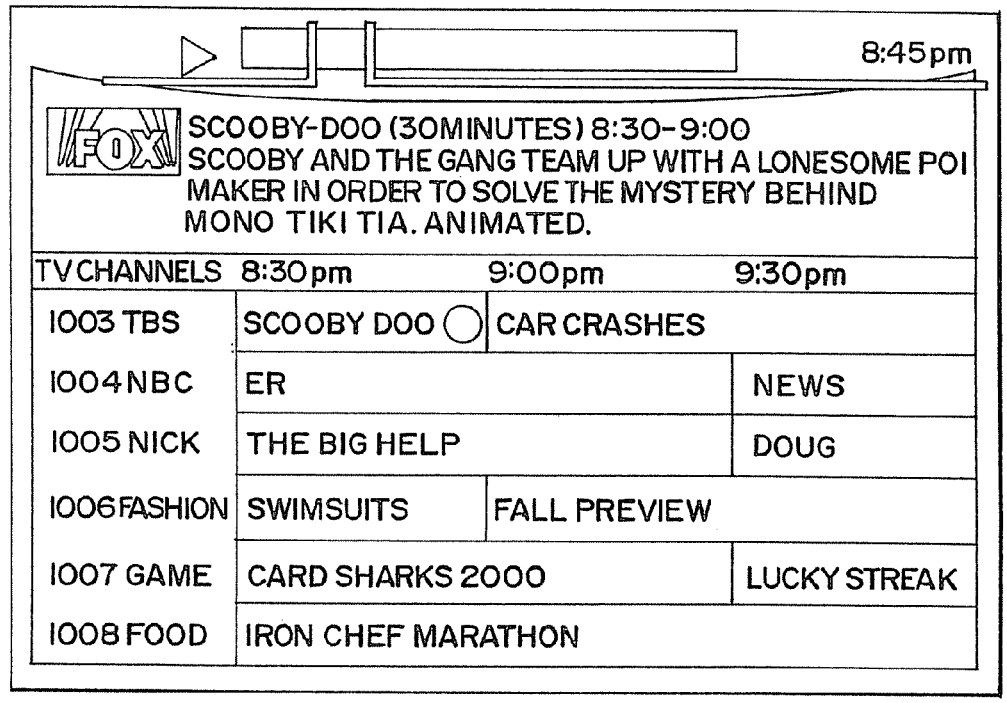
FIG. 8 is a screen shot illustrating a channel guide as may be implemented in the present invention and illustrating single show recording.

Another method of specifying criteria for recording a show is to simply click on a show name in the channel guide. This is illustrated by FIG. 8 which again illustrates a screen shot showing a channel guide. In this illustration, the user has selected "Scooby Doo" by clicking on the "Scooby Doo" portion of the screen. The user may then click the record button a single time with a cursor control device. After the single click, a dot is placed on the screen by the "Scooby Doo" show name indicating the system is now programmed to recorded that episode of "Scooby Doo".

Figure 9:
FIG. 9 is a screen shot illustrating a channel guide as may be implemented in the present invention and illustrating series recording.

FIG. 9 illustrates a method of specifying that all shows in a series are to be recorded. In FIG. 9, the user clicked the record button a second time. In the described embodiment, this causes a double dot to be placed by "Scooby Doo" and all shows in the series "Scooby Doo" will be recorded. Clicking the record button a third time while Scooby Doo is selected will cause recording of the show to be cancelled.

In the described embodiment, the user may also depress the record button while viewing a show. A dialog box will appear asking whether the user wishes to record the show currently be watched or all shows in the series. The user may select either option. The show (and if requested all shows in the series) will then be recorded and a personal channel for the show will be created.

The user may also specify "negative" criteria—e.g., criteria indicating that a show is not to be recorded even if it otherwise meets criteria for recording. For example, a user may specify "Ignore all Sienfield" and that particular situation comedy would not be recorded even if there is general criteria to record situation comedies. In addition, in such embodiments, the system may be configured such that shows meeting the negative criteria are not displayed when the channel guide data is displayed.

Importantly, in addition to selecting shows for recording based on exact matches to user entered criteria, block 301, shows may also be selected based on "fuzzy match logic", block 305. A "fuzzy" match may occur where the description of a show matches some but not all keywords or satisfies less than all of the criteria. In addition, a "fuzzy" match may occur by the system making assumptions about the viewing habits of the user. For example, if the user has been consistently recording a particular television series (e.g., "Tool Time" starring Tim Allan), the fuzzy logic may choose to record a movie starring Tim Allan. If the user typically chooses to record action movies by title, fuzzy logic may be employed to select an action movie for recording.

As another method of providing fuzzy logic selection of shows, after viewing a show, block 401, the user may be asked to provide input on the show, block 402. For example, the system may ask the user to rate their enjoyment of the show overall on a scale (e.g., 1-10), to rate the lead actor, to rate the lead actress, etc. The criteria database can then be updated with information from the user's answers to the rating questions, block 403. This information can then be used in a "fuzzy" logic selection process, e.g., the user rates action movies high which star Tom Cruise. The fuzzy logic process may then look perform pattern matching for other action movies starring Tom Cruise or may employ further intelligence based, for example on viewer surveys, to determine that a viewer who enjoys Tom Cruise action movies also enjoys Star Trek. Star Trek may then be selected for recording. It should be noted that while the system may employ fuzzy logic to directly select shows for recording, it many implementations it may be preferable to query the user to determine if the show should be recorded.

The described embodiment also always multiple users to provide criteria information. For example, in a household, both the husband and wife may provide criteria information, blocks 501 and 503. The criteria information for each user is stored separately in the criteria database, block 502 and 504. The system may then employ pattern matching and fuzzy logic to record shows which may be of interest to both users.

At any time, the user may preview shows which will be recorded based on the criteria information provided. The user selects the preview function, block 601 and the system proceeds to match shows from the channel guide database 103 against the criteria database 104, block 602. Based on the matching criteria, a list of shows to be recorded is displayed, block 603. The user may then edit the list by, for example, deleting shows from the list which the user does not wish to be recorded, block 604.

As one additional feature of the system, the system may provide notification to the user when programming of interest is available. For example, if a user recorded all episodes of a situation comedy during the previous season, the system may notify the user when a new season programming is scheduled to begin based on information from the channel guide database. The system may notify the user when the system is activated or in embodiments which provide a connection to the Internet, the system may notify the user by email.

Personal Channels

The described embodiment provides a unique system for organization of shows for viewing. A user may set up personal channels. Personal channels are are logical organizations of recorded shows. For example, a personal channel may be set up to record the situation comedy "Tool Time", another personal channel may be set up to record sporting events, another personal channel may be set up to record childrens programming, another personal channel may be set up to record cooking shows, another for action movies, another for news broadcasts, etc. When the user stores criteria information to select shows for recording, the user may also specify a personal channel to store the recorded show in.

Generally, the personal channels may be labeled with any name selected by the user. However, as one feature of the described embodiment, while viewing a show, the user may select a set up personal channel function (using one of several methods such as by selecting record while viewing a show or by selecting a show from the channel guide and then pressing the record button). The system will proceed to set up a personal channel for the show and initially label the personal channel with the show name. In addition, if the show is a series or mini-series, the system will add to the criteria database criteria to record the series in the future and to put the recorded shows into the newly established personal channel.

Figure 10:
FIG. 10 is a screen shot illustrating a channel guide as may be implemented in the present invention and illustrating use of an personal channel guide.

As is illustrated by FIG. 10, personal channels may be displayed, similar to other channels, in the user interface. In the illustrated embodiment, the personal channel guide, showing personal channels for the series "Friends" (P100 Friends), for "Tonight" (P101 Tonight) and for science shows (P102 Science) is integrated in the same display with the channel guide previously illustrated in FIGS. 7-9. In alternative embodiments, the personal channel guide may be provided on a separate display. In addition, other user interface features may be provided. For example, the user interface may display an indictor by each personal channel indicating that the channel includes new content.

Associated with any particular personal channel is a size parameter indicating the amount of disk space (or minutes of recording time or number of episodes) which are to be stored in the personal channel. When the size is exceeded, the system automatically deletes the oldest show in the personal channel in order to make room for new shows to be recorded.

In certain embodiments the size is set by default to record a single show when a personal channel is added. The user may adjust the size to allow recording multiple shows in the personal channel. In addition, in certain embodiments, the system allocates disk space for the personal channel when the personal channel is created. In this way, the user is assured there will be room to record the show at the time the show is scheduled. If there is not sufficient room on the disk to allocate space when the personal channel is created, the user is given opportunity to delete other previously recorded or previously allocated disk space.

In addition, the various information from the channel guide (e.g., ratings, actor/actress names, director names, keywords, awards given) may be recorded in the personal channel so that it may be accessed even after the channel guide information for the broadcast program has expired and has been deleted.

Recording from a Default Channel when not Busy

In certain embodiments of the present invention, a feature may be provided to allow continuous recording of a predetermined channel when the system is not busy recording some other programming.

For example, the system may be configured to continuously record the CNN news channel so that the latest version of the CNN news is always available and recorded. CNN (or similar format video programming) is particularly of interest for continuous recording because the format is relatively fixed with news at a predetermined time during each hour, sports at another predetermined time, business news at another predetermined time, etc. Assume for example that general news is provided on the hour, sports on the 15 minutes, business news at 25 minutes after the hour, weather at 40 minutes after the hour and special interest stories at ten minutes before the hour. If a user has the system configured to continuously record CNN, and wants to watch business news, the user may sit down at 5 minutes after the hour and watch the recorded business news from 40 minutes earlier rather than having to wait 20 minutes for the next real-time airing of business news.

Program Indexing

CNN HeadLine News is an example of programming which may be indexed based on the established format of the show (e.g., sports always shown at the same number of minutes past the hour). In addition, the system may use other methods of indexing shows to allow a user to jump to a selected location in the program such as by indexing based on text from closed captioning. Use of program indexing methods allows the user to further refine selection criteria beyond selection of particular shows to watch and, instead, allowing the further granularity of selecting portions of shows to watch.

Another method of indexing may allow the user to periodically download program indexes from a source. The program indexes may have been generated manually and the user may subscribe to the source in order to obtain the program indexes. In this embodiment, the source may manually generate program indexes for certain shows. For example, television magazine shows (such as 60 Minutes) may be indexed by topic, talk shows may be indexed (for example by guest, to show the start David Letterman's Top Ten List, etc.). The index may be obtained by any number of methods including allowing the user's system to dial-in to the indexing source or alternatively by satellite broadcast. Programs, such as CNN Headlines News, which are originally recorded with a defined format and other programming which has been indexed post-recording, may be referred to herein as defined format or indexable format video programs.

In certain embodiments, recording may be based on the segment information. For example, the closed caption information may be examined on-the-fly, searching for keywords, while the channel is being recorded. If the keywords are encountered, a segment of the programming before and after the keywords is retained in a personal channel. Alternatively, a particular channel may be continuously recorded and the index information (closed caption information or other information) may be examined after recording to determine what segments of the recorded information are to be retained.

Thus, what has been disclosed is an improved video data recorder.

What is claimed is:

1. A method comprising:
    receiving, by a digital video data recorder, a representation of a criterion, wherein the criterion indicates future shows to record;
    responsive to receiving the representation of the criterion, creating a personal channel on a recording medium for storage of the future shows, wherein a size of the personal channel is defined prior to the recording of any shows in the personal channel;
    storing, by the digital video data recorder, the criterion in a criteria database, wherein the criteria database contains criteria for selecting whether to record shows on a plurality of channels;
    determining, by the digital video data recorder, that a show appearing in a channel guide database meets the criterion stored in the criteria database, wherein the channel guide database contains information about shows on the plurality of channels; and responsive to determining that the show meets the criterion, recording and storing, by the digital video data recorder, the show in the personal channel.

2. The method of claim 1, wherein a name of the personal channel is based on a name of the show.

3. The method of claim 1, wherein the size of the personal channel specifies a number of episodes of the show.

4. The method of claim 1, wherein the list of channels includes multiple personal channels.

5. The method of claim 1, further comprising:
determining, by the digital video data recorder, that the personal channel is full; and
in response to determining that the personal channel is full, deleting, by the digital video data recorder an oldest recorded program from the personal channel.

6. The method of claim 1, further comprising:
providing, by the digital video data recorder, a list of personal channels available on the recording medium, the personal channel included in the list of available personal channels; and
providing, by the digital video data recorder, a list of programming associated with the personal channel, the show included in the list of programming.

7. The method of claim 1, wherein the criterion is selected from the group consisting of a rating, a description of the show, a name of an actor, a name of a director, and an award.

8. The method of claim 1, wherein the criterion is specified by a user selecting a name of the show while viewing at least some of the channel guide database.

9. The method of claim 1, wherein determining that the show meets the criterion comprises determining that the show satisfies some, but not all, aspects of the criterion.

10. An article of manufacture, including a non-transitory computer-readable medium, having program instructions stored thereon that, in response to execution by a computing device, cause the computing device to perform operations comprising:
receiving, by a digital video data recorder, a representation of a criterion, wherein the criterion indicates future shows to record;
responsive to receiving the representation of the criterion, creating a personal channel on a recording medium for storage of the future shows, wherein a size of the personal channel is defined prior to the recording of any shows in the personal channel;
storing, by the digital video data recorder, the criterion in a criteria database, wherein the criteria database contains criteria for selecting whether to record shows on a plurality of channels;
determining, by the digital video data recorder, that a show appearing in a channel guide database meets the criterion stored in the criteria database, wherein the channel guide database contains information about shows on the plurality of channels; and
responsive to determining that the show meets the criterion, recording and storing, by the digital video data recorder, the show in the personal channel.

11. The article of manufacture of claim 10, wherein a name of the personal channel is based on a name of the show.

12. The article of manufacture of claim 10, wherein the size of the personal channel specifies a number of episodes of the show.

13. The article of manufacture of claim 10, wherein the list of channels includes multiple personal channels.

14. The article of manufacture of claim 10, the program instructions also causing the computing device to perform operations comprising:
determining that the personal channel is full; and
in response to determining that the personal channel is full, deleting an oldest recorded program from the personal channel.

15. The article of manufacture of claim 10, the program instructions also causing the computing device to perform operations comprising:
providing a list of personal channels available on the recording medium, the personal channel included in the list of available personal channels; and
providing a list of programming associated with the personal channel, the show included in the list of programming.

16. The article of manufacture of claim 10, wherein the criterion is specified by a user selecting a name of the show while viewing at least some of the channel guide database.

17. The article of manufacture of claim 10, wherein determining that the show meets the criterion comprises determining that the show satisfies some, but not all, aspects of the criterion.

18. A digital video data recorder comprising:
a recording medium;
an interface;
a channel guide database containing information about shows on a plurality of channels;
a criteria database containing criteria for selecting whether to record shows on the plurality of channels; and
a personal channel, wherein upon receiving a representation of a criterion that indicates future shows to record, the criteria database stores the criteria and a personal channel is created on a recording medium for storage of the future shows, wherein a size of the personal channel is defined prior to the recording of any shows in the personal channel, and wherein upon determining that a show appearing in the channel guide database meets the criterion stored in the criteria database, the recording medium recording and storing the show in the personal channel.

* * * * *